(12) United States Patent
Whitehouse et al.

(10) Patent No.: US 9,306,384 B2
(45) Date of Patent: Apr. 5, 2016

(54) METHOD OF FAULT CLEARANCE

(71) Applicant: ALSTOM Technology Ltd, Baden (CH)

(72) Inventors: Robert Whitehouse, Stafford (GB); Carl David Barker, Staffordshire (GB)

(73) Assignee: General Electric Technology GmbH, Baden (CH)

(*) Notice: Subject to any disclaimer, the term of this patent is extended or adjusted under 35 U.S.C. 154(b) by 0 days.

(21) Appl. No.: 14/382,532

(22) PCT Filed: Feb. 26, 2013

(86) PCT No.: PCT/EP2013/053834
§ 371 (c)(1),
(2) Date: Sep. 2, 2014

(87) PCT Pub. No.: WO2013/131782
PCT Pub. Date: Sep. 12, 2013

(65) Prior Publication Data
US 2015/0116876 A1    Apr. 30, 2015

(30) Foreign Application Priority Data

Mar. 5, 2012   (GB) .................................. 1203785.9

(51) Int. Cl.
*H02H 7/00*    (2006.01)
*H02H 7/26*    (2006.01)
*H02H 3/06*    (2006.01)

(52) U.S. Cl.
CPC .............. *H02H 7/268* (2013.01); *H02H 3/06* (2013.01); *H02H 7/261* (2013.01)

(58) Field of Classification Search
CPC .................................................... H02H 7/262
USPC ............................................................ 361/66
See application file for complete search history.

(56) References Cited

U.S. PATENT DOCUMENTS 3,970,898 A * 7/1976 Baumann et al. ................ 361/68
4,638,415 A * 1/1987 Neupauer ........................ 363/35

(Continued)

FOREIGN PATENT DOCUMENTS

EP      0 554 553    8/1993
GB      1 124 521    8/1968

(Continued)

OTHER PUBLICATIONS

Barker, CD et al., "An Alternative Approach to HVDC Grid Protection," Alstom Grid, Power Electronics Activities, Stafford United Kingdom (2012).
Barker CD et al., "An Alternative Approach to HVDC Grid Protection," Alstom PowerPoint Presentation (Dec. 2012).
International Search Report and Written Opinion, PCT Application No. PCT/EP2013/053834, 9 pages (Jul. 5, 2013).

*Primary Examiner* — Stephen W Jackson
(74) *Attorney, Agent, or Firm* — Foley & Lardner LLP (57) ABSTRACT

There is a method of fault clearance for a DC power grid (10), wherein the DC power grid (10) includes: a plurality of DC terminals (12a,12b,12c,12d); a plurality of DC power transmission media (14a,14b, 14c,14d) to interconnect the plurality of DC terminals (12a, 12b, 12c, 12d); and a plurality of DC circuit interruption device stations (18), each DC circuit interruption device station (18) being associated with a respective one of the plurality of DC power transmission media (14a, 14b, 14c, 14d) and a respective one of the plurality of DC terminals (12a, 12b,12c, 12d), each DC circuit interruption device station (18) including a DC circuit interruption device (20) to selectively interrupt current flow in the associated DC power transmission medium (14a, 14b, 14c, 14d), the method comprising the steps of: (i) detecting one or more faults occurring in the plurality of DC power transmission media (14a, 14b, 14c,14d); (ii) after detecting the or each fault, opening all of the DC circuit interruption devices (20) to interrupt current flow in the plurality of DC power transmission media (14a,14b, 14c,14d); (iii) measuring electrical characteristics of each DC power transmission medium (14a, 14b, 14c,14d); (iv) identifying the or each faulty DC power transmission medium (14a, 14b, 14c, 14d), in which the or each fault is located, based on the measured electrical characteristics of the plurality of DC power transmission media (14a, 14b, 14c, 14d); and (v) after identifying the or each faulty DC power transmission medium (14a, 14b, 14c, 14d) in which the or each fault is located, inhibiting closing of the or each DC circuit interruption device (20) that is associated with the or each faulty DC power transmission medium (14a, 14b, 14c,14d), in which the or each fault is located, and closing the or each DC circuit interruption device (20) that is associated with the or each non-faulty DC power transmission medium (14a, 14b, 14c, 14d), in which the or each fault is not located.

18 Claims, 6 Drawing Sheets

(56) References Cited

U.S. PATENT DOCUMENTS 8,081,497 B2 * 12/2011 Radbrant et al. ............... 363/35
9,000,623 B2 * 4/2015 Berggren et al. ............ 307/113

FOREIGN PATENT DOCUMENTS

GB          1 512 444    6/1978
WO    WO-2011/157305    12/2011

* cited by examiner

METHOD OF FAULT CLEARANCE

This invention relates to a method of fault clearance for a DC power grid.

A new class of high voltage direct current (HVDC) power transmission networks are being considered for moving large quantities of power over long distances, as required by geographically dispersed renewable forms of generation, and to augment existing capabilities of AC power transmission networks with smartgrid intelligence and features that are able to support modern electricity trading requirements. Such a network is sometimes referred to as a DC power grid.

A DC power grid requires multi-terminal interconnection of HVDC converters, whereby power can be exchanged on the DC side using three or more HVDC converters operating in parallel. Each HVDC converter acts as either a source or sink to maintain the overall input-to-output power balance of the network whilst exchanging the power as required.

According to an aspect of the invention, there is provided a method of fault clearance for a DC power grid, wherein the DC power grid includes: a plurality of DC terminals; a plurality of DC power transmission media to interconnect the plurality of DC terminals; and a plurality of DC circuit interruption device stations, each DC circuit interruption device station being associated with a respective one of the plurality of DC power transmission media and a respective one of the plurality of DC terminals, each DC circuit interruption device station including a DC circuit interruption device to selectively interrupt current flow in the associated power transmission medium, the method comprising the steps of:

(i) detecting one or more faults occurring in the plurality of DC power transmission media;
(ii) after detecting the or each fault, opening all of the DC circuit interruption devices to interrupt current flow in the plurality of DC power transmission media;
(iii) measuring electrical characteristics of each DC power transmission medium;
(iv) identifying the or each faulty DC power transmission medium, in which the or each fault is located, based on the measured electrical characteristics of the plurality of DC power transmission media; and
(v) after identifying the or each faulty DC power transmission medium in which the or each fault is located, inhibiting closing of the or each DC circuit interruption device that is associated with the or each faulty DC power transmission medium in which the or each fault is located, and closing the or each DC circuit interruption device that is associated with the or each non-faulty DC power transmission medium, in which the or each fault is not located.

For the purposes of this specification, opening a circuit interruption device refers to the use of the circuit interruption device to open a closed circuit to interrupt current flow in the circuit, while closing a circuit interruption device refers to the use of the circuit interruption device to complete an open circuit to permit current flow in the circuit.

A DC circuit interruption device may be any device that is capable of interrupting direct current flow in a DC circuit. Such a DC circuit interruption device may be, but is not limited to, a DC circuit breaker.

A DC power transmission medium may be any medium that is capable of transmitting electrical power between two or more DC terminals. Such a medium may be, but is not limited to, a submarine DC power transmission cable, an overhead DC power transmission line or cable and an underground DC power transmission cable.

The occurrence of one or more faults occurring in the plurality of the DC power transmission media may lead to one or more fault currents flowing through the DC power grid. The fault may, for example, be in the form of a short circuit with low impedance across DC power transmission cables. This may occur due to damage or breakdown of insulation, lightning strikes, movement of conductors or other accidental bridging between conductors by a foreign object.

Detection of the or each fault may be carried out locally at each DC circuit interruption device station to enable rapid detection of a fault in the associated DC power transmission medium. Such rapid detection may be achieved by, for example, using an embodiment of the method in which the step of detecting a fault occurring in the plurality of DC power transmission media involves carrying out direct or derivative measurements of current and/or voltage characteristics of the associated DC power transmission medium.

Preferably each DC circuit interruption device station includes fault detection equipment to detect one or more faults in the associated DC power transmission medium, wherein each DC circuit interruption device opens in response to detection of the or each fault in the plurality of DC power transmission media by the fault detection equipment of the corresponding DC circuit interruption device station.

A DC circuit interruption device is usually designed to open on command, i.e. trip, upon detection of a fault in a circuit directly connected to the DC circuit interruption device.

The low impedance nature of the DC power grid results in all DC terminals of the DC power grid being affected by the or each fault occurring in the plurality of DC power transmission media. This causes the or each fault to be detected locally at each DC circuit interruption device station. In the method according to the invention, this will automatically cause each DC circuit interruption device to trip.

Opening all of the DC circuit interruption devices upon detection of the or fault occurring in the plurality of DC power transmission media enables speedy interruption of the or each fault current in the DC power grid, whilst the or each fault current is still within the current interruption capability of each DC circuit interruption device. This prevents a rise in level of the or each fault current until it exceeds the current interruption capability of each DC circuit interruption device. In the event a fault current exceeds the current interruption capability of a DC circuit interruption device, it is not possible to open the DC circuit interruption device.

Figure 1:
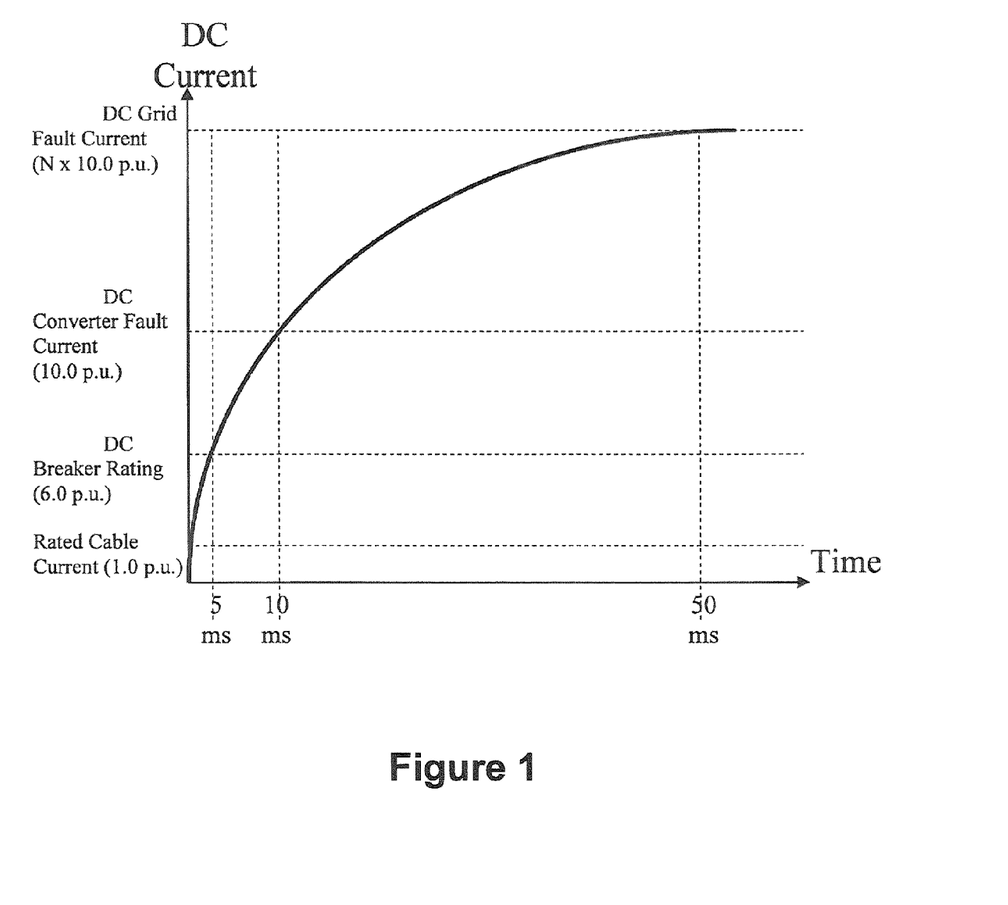
FIG. 1 illustrates the relative magnitudes of current in a DC power grid.

FIG. 1 illustrates the relative magnitudes of current in a DC power grid. It can be seen that, during a fault in the DC power grid, a DC power transmission medium current with a normal operating value of 1.0 per unit current may exceed the current interruption capability of a typical DC circuit breaker with a 6.0 per unit current rating within 5 ms, and may reach a DC converter fault current of 10.0 per unit current within 10 ms and a DC power grid fault current of several multiples of the DC converter fault current within 50 ms. It is therefore essential to open all of the DC circuit interruption devices immediately after the or each fault is detected, in order to ensure successful interruption of current flow in the DC power grid.

The step of opening all of the DC circuit interruption devices after detection of the or each fault is further advantageous in that this step obviates the need to operate AC circuit breakers to interrupt current flow in the DC power grid, which adversely impacts the duration of complete power transmission capability through the DC power grid. This is because, in many conventional converter topologies, the use of diodes forming part of power transistors for use in power electronic switches results in an inherent conduction path through a converter. Hence, in the event of a fault in the DC power grid, discharge current may flow through the conduction path from the AC power grid and into the fault via the DC power grid. The flow of discharge current means that circuit isolating switches cannot be opened to isolate the faulty section of the DC power grid until the magnitude of the discharge current has fallen below the current interruption capability of the circuit isolating switches. It is therefore necessary to first trip all AC circuit breakers connected to all converters of the DC power grid to isolate the converter from an associated AC network before using circuit isolating switches to disconnect a faulty section of the DC power grid and then re-energising the remaining parts of the DC power grid. Isolating the converter from its associated AC network and then reclosing the AC circuit breaker to reconnect the converter would however take a finite period of time. Typically AC circuit breakers can trip quickly but can however take three or four times longer to reclose.

Identification of the or each faulty DC power transmission medium in which the or each fault is located is carried out after all of the DC circuit interruption devices have been opened. This is possible because each faulty DC power transmission medium will be subjected to a low impedance and will typically have, on average, a zero residual DC voltage level. Meanwhile each non-faulty DC power transmission medium will have a non-zero residual DC voltage level due to the presence of trapped charge. Such differences in the electrical characteristics of the faulty and non-faulty DC power transmission media are readily measured to provide information that makes it straightforward to identify the or each faulty DC power transmission medium.

Measurement of electrical characteristics of each DC power transmission medium may be done locally at each DC circuit interruption device station without the need for communication between different DC circuit interruption device stations or with a central control station, thus resulting in a straightforward and rapid identification of the or each faulty DC power transmission medium. This has the benefit of minimising the amount of time of zero power transmission in the DC power grid, which minimises inconvenience to the DC power grid's end users.

The step of measuring electrical characteristics of each DC power transmission medium may be carried out in a number of different ways after all of the DC circuit interruption devices have been opened.

In embodiments of the invention, the step of measuring electrical characteristics of each DC power transmission medium may involve measuring a residual DC voltage level of each DC power transmission medium.

In further embodiments of the invention, the step of measuring electrical characteristics of each DC power transmission medium may involve measuring a voltage oscillation frequency of each DC power transmission medium.

Measurement of voltage characteristics of each DC power transmission medium in this manner permits the or each faulty DC power transmission medium to be identified.

In still further embodiments of the invention, the step of measuring electrical characteristics of each DC power transmission medium may involve measuring magnitude and direction of one or more fault currents in the plurality of DC power transmission media.

In such embodiments, the step of identifying the or each faulty DC power transmission medium, in which the or each fault is located, based on the measured electrical characteristics of the plurality of DC power transmission media may involve communicating information between different DC circuit interruption device stations, the information including magnitude and direction of the or each fault current in the plurality of DC power transmission media.

In other such embodiments and wherein the DC power grid further includes a control station to communicate with the plurality of DC circuit interruption device stations, the step of identifying the or each faulty DC power transmission medium, in which the or each fault is located, based on the measured electrical characteristics of the plurality of DC power transmission media may involve communicating information between each DC circuit interruption device station and a control station, the information including magnitude and direction of the or each fault current in the plurality of DC power transmission media.

Measurement of magnitude and direction of one or more fault currents in the plurality of DC transmission media also permits the or each faulty DC power transmission medium to be identified.

The step of identifying the or each faulty DC power transmission medium, in which the or each fault is located, based on the measured electrical characteristics of the plurality of DC power transmission media may involve determining a location of the or each fault within the or each faulty DC power transmission medium.

Measurement of the voltage characteristics of each DC power transmission medium may allow the location of the fault within the or each faulty DC power transmission medium to be identified.

Once the or each faulty DC power transmission medium is identified, the or each DC circuit interruption device associated with the or each faulty DC power transmission media is inhibited from closing to prevent the or each fault current from flowing within the DC power grid, while normal operation of the or each non-faulty DC power transmission media is resumed by closing the or each corresponding DC circuit interruption device.

The DC power grid may be operated to carry out the steps of inhibiting closing of and opening of each DC circuit interruption device in a number of different ways after the or each faulty DC power transmission medium has been identified.

In embodiments of the invention and wherein the DC power grid further includes a control station to communicate with the plurality of DC circuit interruption device stations, the step of closing the or each DC circuit interruption device that is associated with the or each non-faulty DC power transmission medium, in which the or each fault is not located, may involve sending a control signal from the control station to the or each DC circuit interruption device station that is associated with the or each non-faulty DC power transmission medium to initiate closing of the or each corresponding DC circuit interruption device.

In other embodiments of the invention, the step of closing the or each DC circuit interruption device that is associated with the or each non-faulty DC power transmission medium, in which the or each fault is not located, involves closing the or each DC circuit interruption device that is associated with the or each non-faulty DC power transmission medium after a predetermined time delay after the opening of all of the DC circuit interruption devices.

When each DC circuit interruption device automatically closes after the predetermined time delay, it is necessary to actively inhibit the or each DC circuit interruption device that is associated with the or each faulty DC power transmission medium.

Active inhibition of the closing of the or each DC circuit interruption device that is associated with the or each faulty DC power transmission medium may be achieved using local control at the corresponding DC circuit interruption device station. Optionally, wherein the DC power grid further includes a control station to communicate with the plurality of DC circuit interruption device stations, the step of inhibiting closing of the or each DC circuit interruption device that is associated with the or each faulty DC power transmission medium in which the or each fault is located may involve sending a control signal from the control station to the or each DC circuit interruption device station that is associated with the or each faulty DC power transmission medium to inhibit closing of the or each corresponding DC circuit interruption device.

Operating a DC power grid in accordance with the method according to the invention therefore results in a reliable and stable DC power grid with minimal off-line time. This is because the method enables the or each fault in the DC power grid to be quickly isolated and segregated from the rest of the DC power grid, in order to allow the rest of the DC power grid to resume normal operation.

Preferred embodiments of the invention will now be described, by way of non-limiting examples, with reference to the accompanying drawings in which.

A method of fault clearance for a DC power grid 10 according to an embodiment of the invention is described as follows, with reference to FIGS. 2 to 5.

Figure 2:
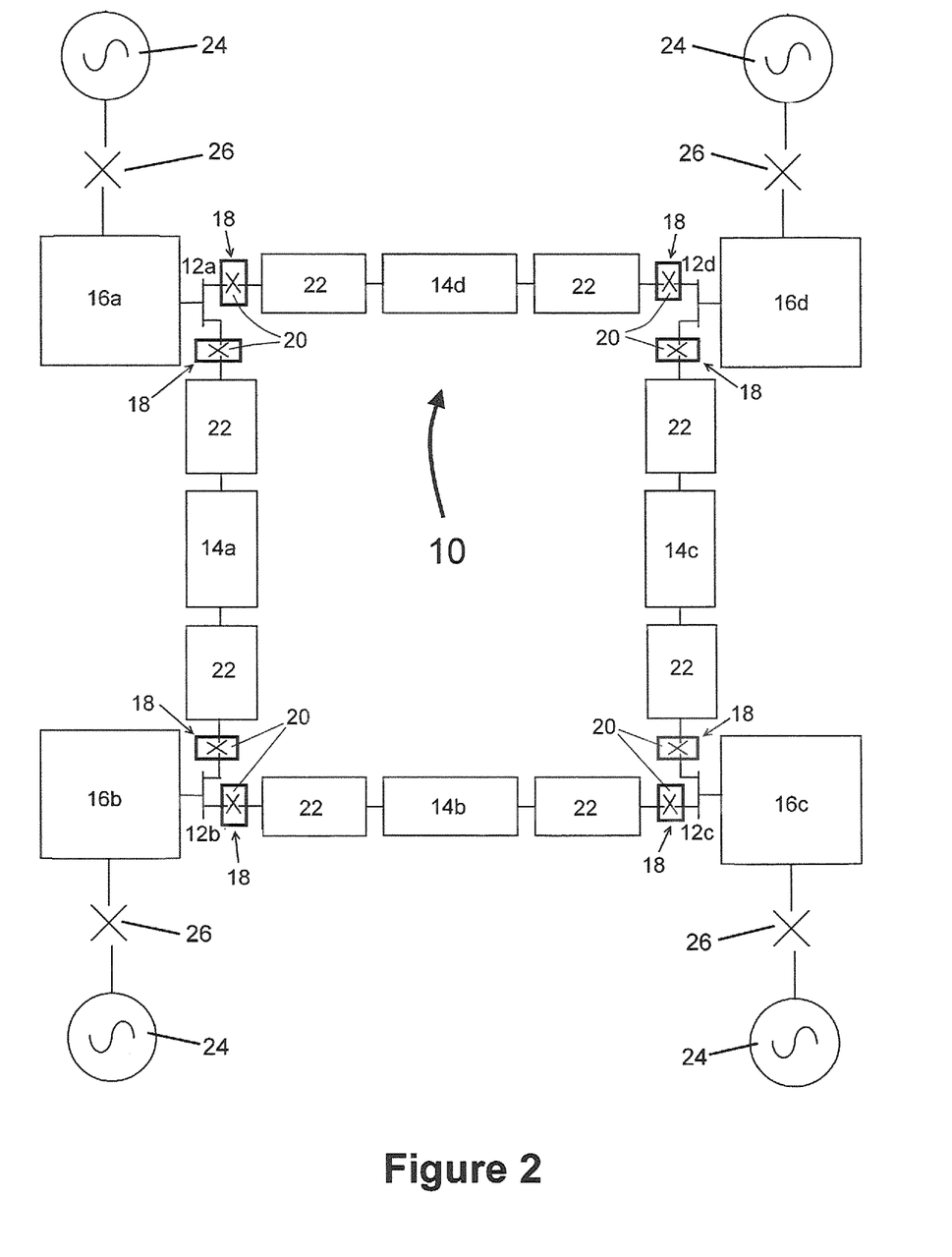
FIG. 2 shows, in schematic form, an example of a four-DC terminal DC power grid.

A DC power grid 10 includes four DC terminals 12a,12b,12c,12d and four DC power transmission lines 14a,14b,14c,14d. Each DC terminal 12a,12b,12c,12d is connected to a power converter 16a,16b,16c,16d, while the four DC power transmission lines 14a,14b,14c,14d are arranged to interconnect the DC terminals, as follows.

A first end of a first DC power transmission line 14a is connected to a first DC terminal 12a, while a second end of the first DC power transmission line 14a is connected to a second DC terminal 12b.

A first end of a second DC power transmission line 14b is connected to the second DC terminal 12b, while a second end of the second DC power transmission line 14b is connected to a third DC terminal 12c.

A first end of a third DC power transmission line 14c is connected to the third DC terminal 12c, while a second end of the third DC power transmission line 14c is connected to a fourth DC terminal 12d.

A first end of a fourth DC power transmission line 14d is connected to the fourth DC terminal 12d, while a second end of the fourth DC power transmission line 14d is connected to the first DC terminal 12a.

The use of the DC power transmission lines 14a,14b,14c,14d to interconnect the four DC terminals 12a,12b,12c,12d permits power transfer between the different DC terminals 12a,12b,12c,12d of the DC power grid 10.

The DC power grid 10 further includes a plurality of DC circuit breaker stations 18. Each DC circuit breaker station 18 includes a DC circuit breaker 20 that is connected between a respective one of the DC terminals 12a,12b,12c,12d and one end of a respective one of the DC power transmission lines 14a,14b,14c,14d, so that a pair of DC circuit breakers 20 is located at opposite ends of each DC power transmission line 14a,14b,14c,14d.

It is envisaged that, in other embodiments, each DC circuit breaker 20 may be replaced by another type of circuit interruption device.

Configuration of the DC power grid 10 in this manner allows each DC circuit breaker 20 to selectively interrupt current flow in the corresponding DC power transmission line 14a,14b,14c,14d, i.e. each DC circuit breaker 20 is controlled to either interrupt or permit current flow in the corresponding DC power transmission line 14a,14b,14c,14d.

The DC power grid 10 further includes a plurality of DC reactors 22. Each DC reactor 22 is connected between a respective one of the DC circuit breakers 20 and one end of a respective one of the DC power transmission lines 14a,14b,14c,14d, so that a pair of DC reactors 22 is located at opposite ends of each DC power transmission line 14a,14b,14c,14d.

The purpose of the DC reactors 22 is to limit the rate of change of direct current flow in the corresponding DC power transmission line 14a,14b,14c,14d.

In other arrangements of the DC power grid 10, it is envisaged that the DC reactors 22 may be omitted.

Each DC circuit breaker station 18 further includes fault detection equipment (not shown) to locally carry out direct or derivative measurements of current and voltage characteristics of the corresponding DC power transmission line 14a,14b,14c,14d. This allows a fault occurring in the corresponding DC power transmission line 14a,14b,14c,14d to be rapidly detected when the fault results in the measured current and voltage characteristics falling outside their normal operating ranges. Each DC circuit breaker 20 trips when a fault is detected by the fault detection equipment of the corresponding DC circuit breaker station 18.

Each power converter 16a,16b,16c,16d is further connected to a respective AC network 24 via a respective AC circuit breaker 26.

Simulations of the fault operation of the DC power grid 10 during a pole-to-pole fault were carried out using PSCAD®/EMTDC™ simulation software.

In a first simulation, the pole-to-pole fault was initiated so as to occur at the centre of the fourth DC power transmission line 14d.

As mentioned above, the low impedance nature of the DC power grid 10 results in all of the DC terminals 12a,12b,12c,12d of the DC power grid 10 being affected by the pole-to-pole fault applied to the fourth DC power transmission line 14d. This in turn allows the fault detection equipment of each DC circuit breaker station 18 to locally detect the occurrence of the pole-to-pole fault, and thereby cause all of the DC circuit breakers 20 to automatically trip.

As mentioned above, opening all the DC circuit breakers 20 after detection of the fault prevents a resulting fault current from rising to a level where it exceeds the current interruption capability of each DC circuit breaker 20. This in turn prevents the DC power grid 10 from being exposed to high fault current that cannot be interrupted.

Figure 3:
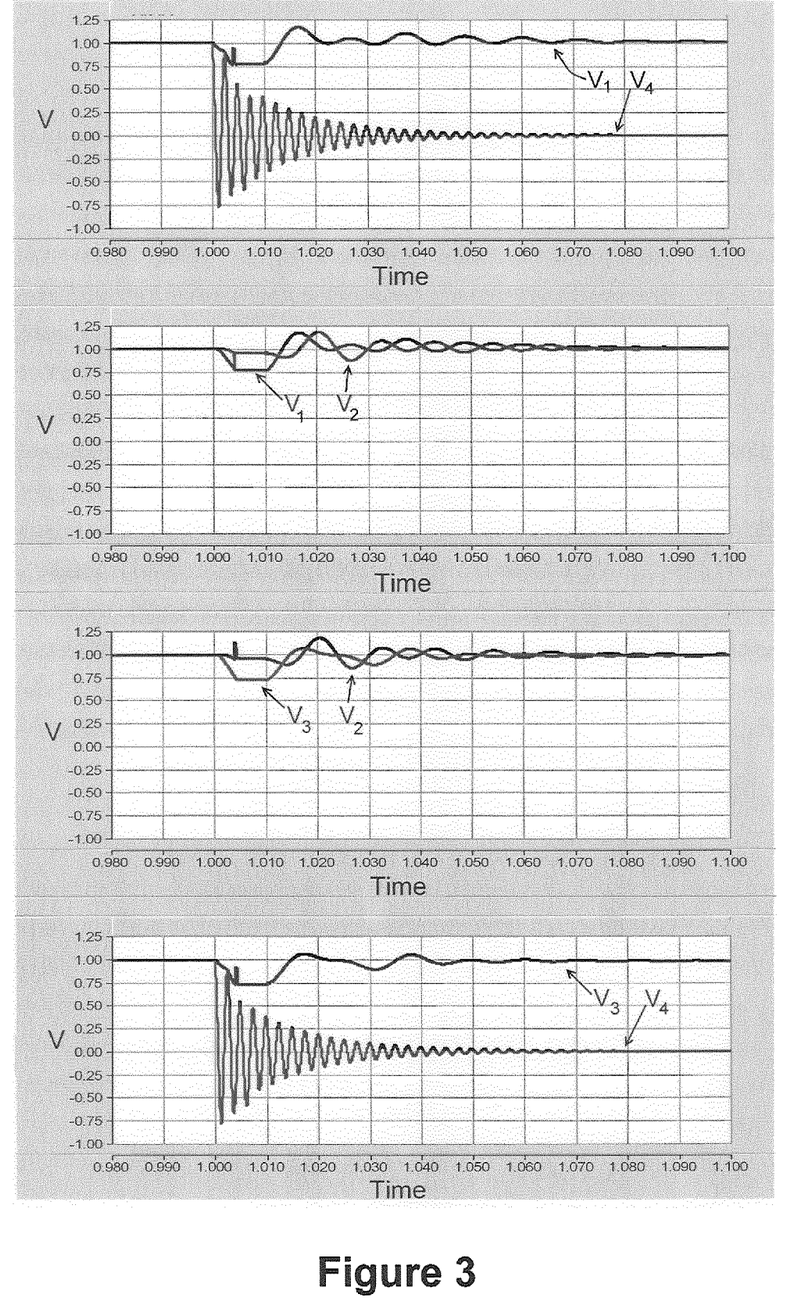
FIG. 3 shows graphs illustrating voltage characteristics for a plurality of DC power transmission lines forming part of the DC power grid of FIG. 2 when a pole-to-pole fault occurs at the centre of one of the DC power transmission lines.

The graphs shown in FIG. 3 illustrates voltage characteristics $V_1,V_2,V_3,V_4$ for each DC power transmission line 14a,14b,14c,14d, as measured by the fault detection equipment of each DC circuit breaker station 18, before and after the occurrence of the pole-to-pole fault in the first simulation.

After occurrence of the pole-to-pole fault, it was found that the DC voltage levels $V_1,V_2,V_3$ in the first, second and third DC power transmission lines 14a,14b,14c remained close to their normal operating voltage level. This is due to the presence of a non-zero residual DC voltage, resulting from trapped charge, in each of the first, second and third DC power transmission lines 14a,14b,14c.

In contrast, after occurrence of the pole-to-pole fault, the voltage level $V_4$ in the fourth DC power transmission line 14d was found to have a zero residual DC voltage in the form of a nominally zero DC voltage with a substantial AC voltage component.

Figure 4:
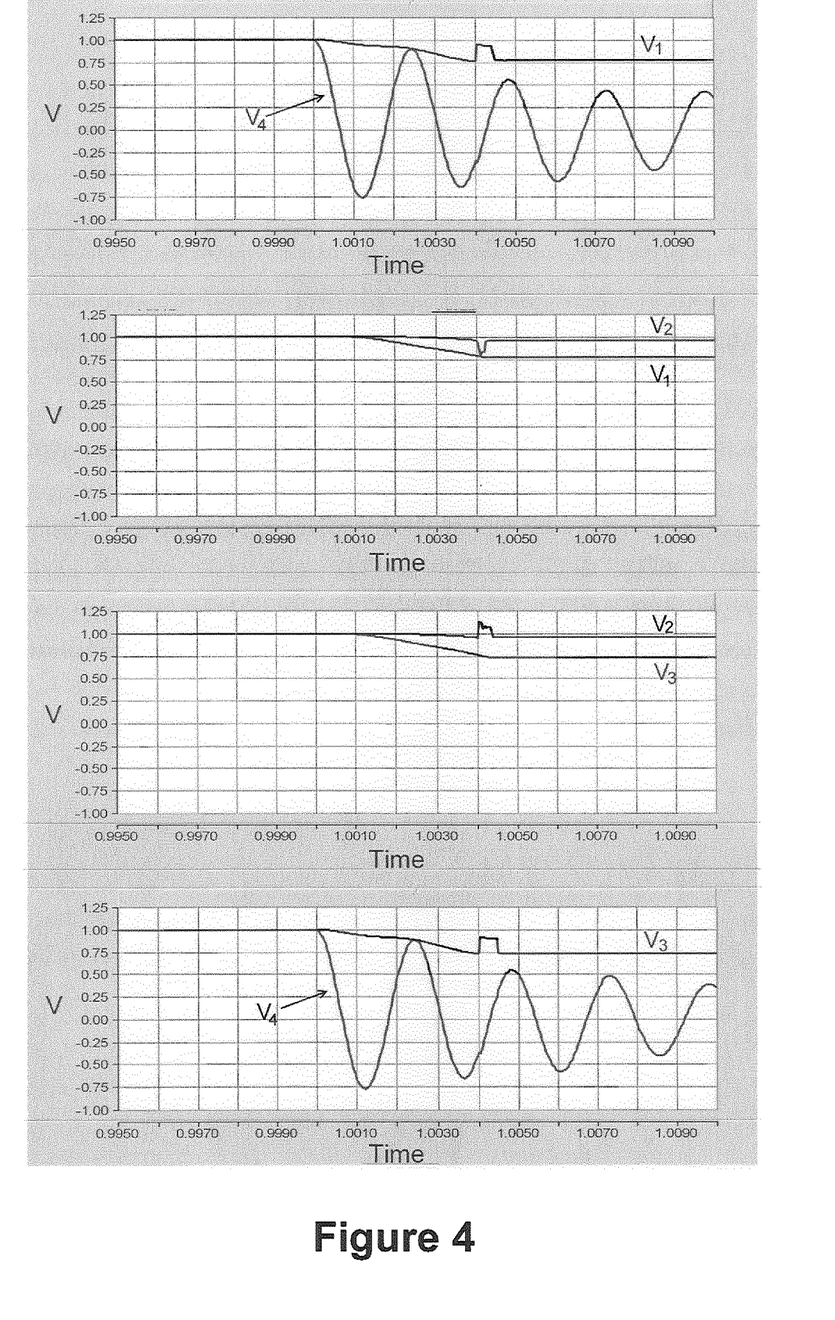
FIG. 4 shows close-ups of the graphs shown in FIG. 3.

The considerable difference in voltage characteristics $V_1,V_2,V_3,V_4$ between the fourth DC power transmission line 14d and the other DC power transmission lines 14a,14b,14c means that it was straightforward to identify the fourth DC power transmission line 14d as the faulty DC power transmission line in which the pole-to-pole fault is located. FIG. 4 shows that this difference is evident within 1 cycle of the voltage oscillation frequency. Thus, the faulty DC power transmission line was able to be quickly identified.

Once the faulty DC power transmission line was identified, the DC circuit breakers 20 connected to the fourth DC power transmission line 14d were inhibited from re-closing, while the DC circuit breakers 20 connected to the first, second and third DC power transmission lines 14a,14b,14c were closed. This therefore enables the first, second and third DC power transmission lines 14a,14b,14c to resume normal operation, whilst the fourth DC power transmission line 14d is kept off-line to allow the pole-to-pole fault to be repaired or removed.

Figure 5:
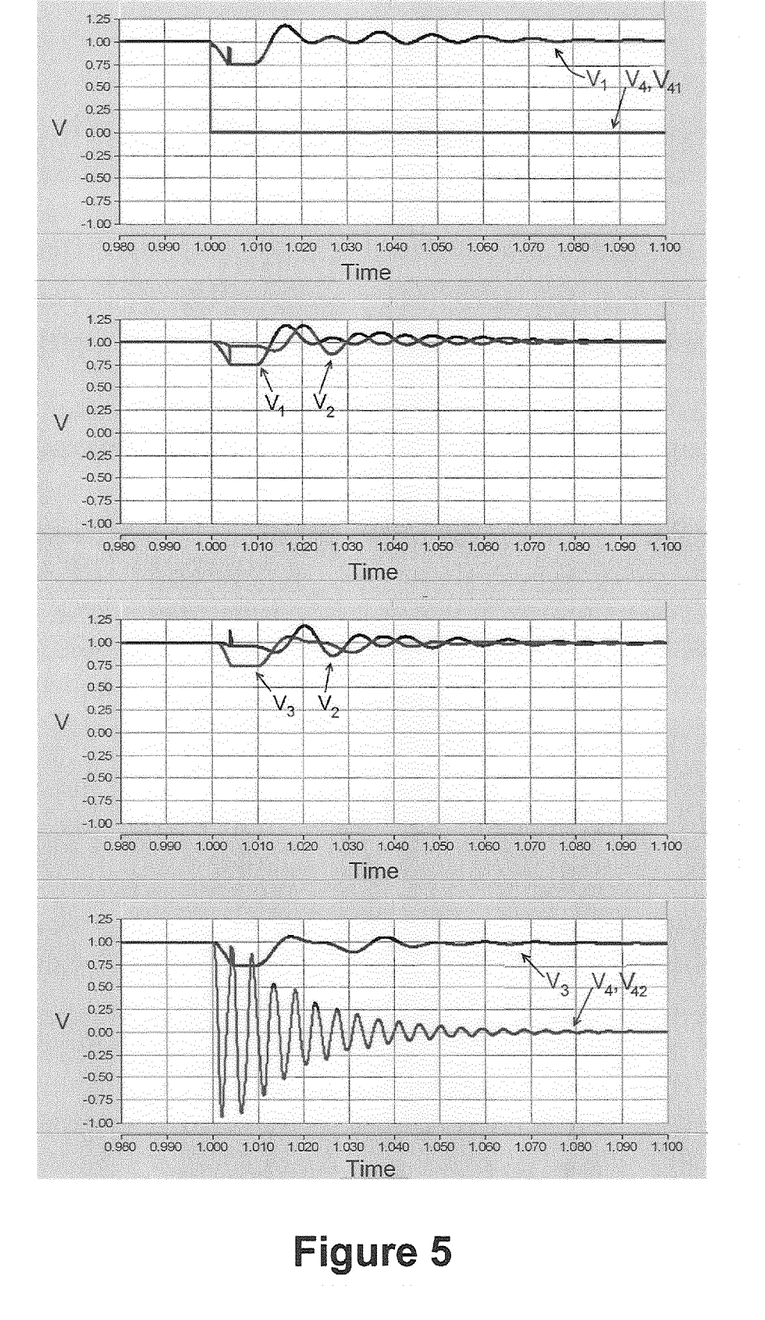
FIG. 5 shows graphs illustrating voltage characteristics for the plurality of DC power transmission lines forming part of the DC power grid of FIG. 2 when a pole-to-pole fault occurs at one end of one of the DC power transmission lines.

In a second simulation, the pole-to-pole fault was initiated so as to occur at the first end of the fourth DC power transmission line 14d.

The graphs shown in FIG. 5 illustrates voltage characteristics $V_1,V_2,V_3,V_4$ for each DC power transmission line 14a, 14b,14c,14d, as measured by the fault detection equipment of each DC circuit breaker station 18, before and after the occurrence of the pole-to-pole fault in the second simulation.

After occurrence of the pole-to-pole fault, it was found that the DC voltage levels $V_1,V_2,V_3$ in the first, second and third DC power transmission lines 14a,14b,14c remained close to their normal operating voltage levels. As mentioned above, this is due to the presence of a non-zero residual DC voltage, resulting from trapped charge, in each of the first, second and third DC power transmission lines 14a,14b,14c.

In contrast, after occurrence of the pole-to-pole fault, the fault detection equipment of the DC circuit breaker station 18 measures the voltage $V_4$ at the second end of the fourth DC power transmission line 14d to be a zero residual DC voltage $V_{42}$ in the form of a nominally zero DC voltage with a substantial AC voltage component in the fourth DC power transmission line 14d. Meanwhile the fault detection equipment of the DC circuit breaker station 18 measures the voltage $V_4$ at the first end of the DC fourth power transmission line 14d to be a zero residual DC voltage $V_{41}$ without an AC voltage component.

It is evident from the considerable difference in voltage characteristics $V_1,V_2,V_3,V_4$ between the fourth DC power transmission line 14d and the other DC power transmission lines 14a,14b,14c that it was straightforward to identify the fourth DC power transmission line 14d as the faulty DC power transmission line in which the pole-to-pole fault is located. In addition, the difference in voltage oscillation frequency between the measured voltages $V_{41},V_{42}$ at the first and second ends of the fourth DC power transmission line 14d means that it was straightforward to determine the location of the pole-to-pole fault to be at the first end of the fourth DC power transmission line 14d.

Use of the method of fault protection according to the invention therefore not only allows rapid and accurate identification of the faulty DC power transmission line in which the fault is located, but also enables the specific location of the fault within the faulty DC power transmission line to be identified.

It is envisaged that the measured voltage characteristics of the DC power transmission lines 14a,14b,14c,14d may be used to determine the location of the fault at any location within a faulty DC power transmission line.

A method of fault clearance for a DC power grid 110 according to a second embodiment of the invention is described as follows, with reference to FIG. 6.

Figure 6:
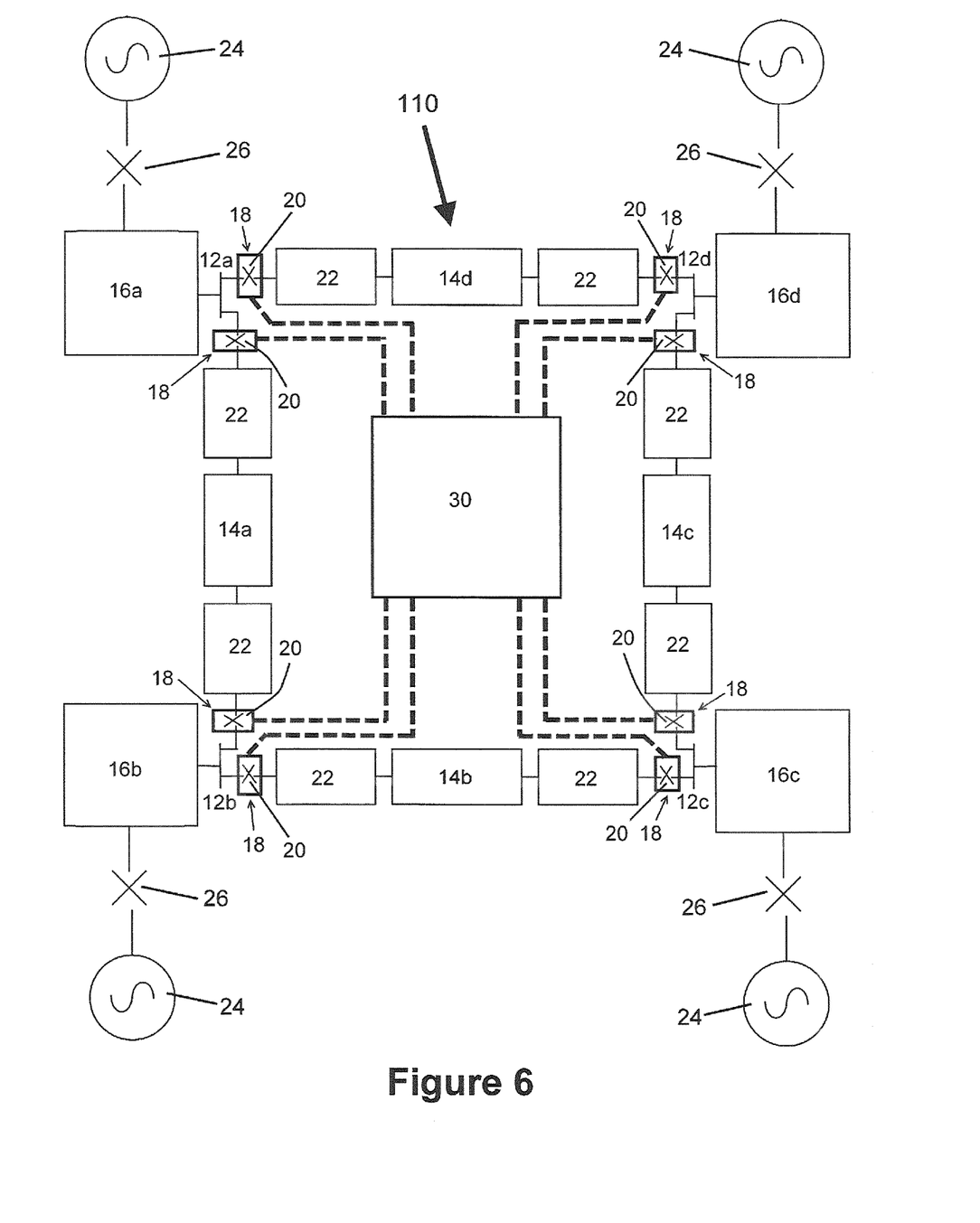
FIG. 6 shows, in schematic form, another example of a four-DC terminal DC power grid that includes a control station.

The DC power grid 110 of FIG. 6 is similar in structure and operation to the DC power grid 10 of FIG. 2, and like features share the same reference numerals. The DC power grid 110 of FIG. 6 differs from the DC power grid 10 of FIG. 2 in that the DC power grid 110 of FIG. 6 further includes a control station 30 to communicate with each DC circuit breaker station 18.

The method according to the second embodiment of the invention is similar to the method according to the first embodiment of the invention except that, in the second method, the faulty DC power transmission medium in the DC power grid 110 of FIG. 6 is identified by measuring magnitude and direction of fault current flowing in the DC power grid 110, instead of measuring voltage characteristics of each DC power transmission line 14a,14b,14c,14d.

In the event of a pole-to-pole fault occurring in the fourth DC power transmission line 14a, the fault detection equipment of each DC circuit breaker station 18 not only detects the pole-to-pole fault, but also measures the magnitude and direction of fault current flowing through the corresponding DC power transmission line 14a,14b,14c,14d.

During the occurrence of the pole-to-pole fault, both ends of the fourth DC power transmission line 14d will experience inflow of fault current. Meanwhile one end of each of the first, second and third DC power transmission lines 14a,14b,14c will experience inflow of fault current, while the other end of each of the first, second and third DC power transmission lines 14a,14b,14c will experience outflow of current.

After all of the DC circuit breakers 20 are opened following detection of the pole-to-pole fault, each DC circuit breaker station 18 communicates information to the other DC circuit breaker stations 18 via the control station 30. The communicated information includes the earlier-measured magnitudes and directions of fault current flowing in the DC power transmission lines 14a,14b,14c,14d.

The differences in fault current magnitude and direction in the fourth DC power transmission line 14d and the other DC power transmission lines 14a,14b,14c allows the fourth DC power transmission line 14d to be identified as the faulty DC power transmission line in which the pole-to-pole fault is located.

Once the faulty DC power transmission line is identified, the DC circuit breakers 20 connected to the fourth DC power transmission line 14d are inhibited from re-closing, while the DC circuit breakers 20 connected to the first, second and third DC power transmission lines 14a,14b,14c are closed. This therefore enables the first, second and third DC power transmission lines 14a,14b,14c to resume normal operation, whilst the fourth DC power transmission line 14d is kept off-line to allow the pole-to-pole fault to be repaired or removed.

In other embodiments of the invention, it is envisaged that the DC power grid 110 may omit the control station 30, and each DC circuit breaker station 18 may directly communicate the information to the other DC circuit breaker stations 18 after all of the DC circuit breakers 20 are opened.

Use of the first and/or second methods according to the invention therefore results in a reliable and stable DC power grid 10,110.

It is envisaged that, in other embodiments, the first and second methods may be used in combination to clear one or more faults in a DC power grid.

It will be appreciated that the method according to the invention is applicable to a DC power grid having a different number of DC terminals and a different arrangement of DC power transmission lines to interconnect the DC terminals. Such a DC power grid may be, but is not limited to, a mesh-connected DC power grid or a radial-connected DC power grid.

The embodiments described above with reference to the DC power grids 10,110 respectively shown in FIGS. 2 and 6 refer to the use of DC power transmission lines 14a,14b,14c, 14d. It is envisaged that, in other embodiments, the method may be used in DC power grids including other DC power transmission media such as, for example, a submarine DC power transmission cable, an overhead DC power transmission line or cable and an underground DC power transmission cable.

The invention claimed is:

1. A method of fault clearance for a DC power grid, wherein the DC power grid includes: a plurality of DC terminals; a plurality of DC power transmission media to interconnect the plurality of DC terminals; and a plurality of DC circuit interruption device stations, each DC circuit interruption device station being associated with a respective one of the plurality of DC power transmission media and a respective one of the plurality of DC terminals, each DC circuit interruption device station including a DC circuit interruption device to selectively interrupt current flow in the associated DC power transmission medium, the method comprising the steps of:
   (i) detecting, at each DC circuit interruption device station, one or more faults occurring in the plurality of DC power transmission media;
   (ii) after detecting the or each fault, opening the DC circuit interruption devices of the corresponding DC circuit interruption device stations at which the or each fault is detected to interrupt current flow in the plurality of DC power transmission media;
   (iii) measuring electrical characteristics of each DC power transmission medium;
   (iv) identifying the or each faulty DC power transmission medium, in which the or each fault is located, based on the measured electrical characteristics of the plurality of DC power transmission media; and
   (v) after identifying the or each faulty DC power transmission medium in which the or each fault is located, inhibiting closing of the or each DC circuit interruption device that is associated with the or each faulty DC power transmission medium, in which the or each fault is located, and closing the or each DC circuit interruption device that is associated with the or each non-faulty DC power transmission medium, in which the or each fault is not located,
   characterised in that the step of measuring electrical characteristics of each DC power transmission medium involves measuring one or more electrical characteristics selected from a group consisting of:
      a residual DC voltage level of each DC power transmission medium;
      a voltage oscillation frequency of each DC power transmission medium;
      differences in fault current magnitude and direction in the plurality of DC power transmission media.

2. The method according to claim 1 wherein the step of detecting one or more faults occurring in the plurality of DC power transmission media involves carrying out direct or derivative measurements of current and/or voltage characteristics of each DC power transmission medium.

3. The method according to claim 1 wherein each DC circuit interruption device station includes fault detection equipment to detect one or more faults in the associated DC power transmission medium, wherein each DC circuit interruption device opens in response to detection of the or each fault in the plurality of DC power transmission media by the fault detection equipment of the corresponding DC circuit interruption device station.

4. The method according to claim 1 wherein the step of measuring electrical characteristics of each DC power transmission medium involves measuring differences in fault current magnitude and direction in the plurality of DC power transmission media, and the step of identifying the or each faulty DC power transmission medium, in which the or each fault is located, based on the measured electrical characteristics of the plurality of DC power transmission media involves communicating information between different DC circuit interruption device stations, the information including differences in fault current magnitude and direction in the plurality of DC power transmission media.

5. The method according to claim 1 wherein the step of measuring electrical characteristics of each DC power transmission medium involves measuring differences in fault current magnitude and direction in the plurality of DC power transmission media, and the DC power grid further includes a control station to communicate with the plurality of DC circuit interruption device stations, wherein the step of identifying the or each faulty DC power transmission medium, in which the or each fault is located, based on the measured electrical characteristics of the plurality of DC power transmission media involves communicating information between each DC circuit interruption device station and a control station, the information including differences in fault current magnitude and direction in the plurality of DC power transmission media.

6. The method according to claim 1 wherein the step of identifying the or each faulty DC power transmission medium, in which the or each fault is located, based on the measured electrical characteristics of the plurality of DC power transmission media involves determining a location of the or each fault within the or each faulty DC power transmission medium.

7. The method according to claim 1 wherein the DC power grid further includes a control station to communicate with the plurality of DC circuit interruption device stations, wherein the step of closing the or each DC circuit interruption device that is associated with the or each non-faulty DC power transmission medium, in which the or each fault is not located, involves sending a control signal from the control station to the or each DC circuit interruption device station that is associated with the or each non-faulty DC power transmission medium to initiate closing of the corresponding DC circuit interruption device.

8. The method according to claim 1 wherein the step of closing the or each DC circuit interruption device that is associated with the or each DC power transmission medium in which the or each fault is not located involves closing the or each DC circuit interruption device that is associated with the or each non-faulty DC power transmission medium after a predetermined time delay after the opening of the DC circuit interruption devices of the corresponding DC circuit interruption device stations at which the or each fault is detected.

9. The method according to claim 1 wherein the DC power grid further includes a control station to communicate with the plurality of DC circuit interruption device stations, wherein the step of inhibiting closing of the or each DC circuit interruption device that is associated with the or each faulty DC power transmission medium, in which the or each fault is located, involves sending a control signal from the control station to the or each DC circuit interruption device station that is associated with the or each faulty DC power transmission medium to inhibit closing of the or each corresponding DC circuit interruption device.

10. A system for fault clearance for a DC power grid, wherein the DC power grid includes a plurality of DC terminals and a plurality of DC power transmission media to interconnect the plurality of DC terminals, the system comprising:
a plurality of DC circuit interruption device stations, each DC circuit interruption device station being associated with a respective one of the plurality of DC power transmission media and a respective one of the plurality of DC terminals, each DC circuit interruption device station including a DC circuit interruption device to selectively interrupt current flow in the associated DC power transmission medium, the plurality of DC circuit interruption device stations configured to:
(i) detect, at each DC circuit interruption device station, one or more faults occurring in the plurality of DC power transmission media;
(ii) after detecting the or each fault, open the DC circuit interruption devices of the corresponding DC circuit interruption device stations at which the or each fault is detected to interrupt current flow in the plurality of DC power transmission media;
(iii) measure electrical characteristics of each DC power transmission medium;
(iv) identify the or each faulty DC power transmission medium, in which the or each fault is located, based on the measured electrical characteristics of the plurality of DC power transmission media; and
(v) after identifying the or each faulty DC power transmission medium in which the or each fault is located, inhibit closing of the or each DC circuit interruption device that is associated with the or each faulty DC power transmission medium, in which the or each fault is located, and close the or each DC circuit interruption device that is associated with the or each non-faulty DC power transmission medium, in which the or each fault is not located,
wherein the measured electrical characteristics are selected from a group consisting of:
a residual DC voltage level of each DC power transmission medium;
a voltage oscillation frequency of each DC power transmission medium; and
differences in fault current magnitude and direction in the plurality of DC power transmission media.

11. The system according to claim 10 wherein the plurality of DC circuit interruption device stations are configured to detect the one or more faults occurring in the plurality of DC power transmission media by carrying out direct or derivative measurements of current and/or voltage characteristics of each DC power transmission medium.

12. The system according to claim 10 wherein each DC circuit interruption device station includes fault detection equipment to detect one or more faults in the associated DC power transmission medium, wherein each DC circuit interruption device opens in response to detection of the or each fault in the plurality of DC power transmission media by the fault detection equipment of the corresponding DC circuit interruption device station.

13. The system according to claim 10 wherein the plurality of DC circuit interruption device stations are configured to measure the electrical characteristics of each DC power transmission medium by measuring differences in fault current magnitude and direction in the plurality of DC power transmission media, and the plurality of DC circuit interruption device stations are configured to identify the or each faulty DC power transmission medium, in which the or each fault is located, based on the measured electrical characteristics of the plurality of DC power transmission media by communicating information between different DC circuit interruption device stations, the information including differences in fault current magnitude and direction in the plurality of DC power transmission media.

14. The system according to claim 10 wherein the plurality of DC circuit interruption device stations are configured to measure the electrical characteristics of each DC power transmission medium by measuring differences in fault current magnitude and direction in the plurality of DC power transmission media, the system further comprising a control station to communicate with the plurality of DC circuit interruption device stations, wherein the plurality of DC circuit interruption device stations are configured to identify the or each faulty DC power transmission medium, in which the or each fault is located, based on the measured electrical characteristics of the plurality of DC power transmission media by communicating information between each DC circuit interruption device station and the control station, the information including differences in fault current magnitude and direction in the plurality of DC power transmission media.

15. The system according to claim 10 wherein the plurality of DC circuit interruption device stations are configured to identify the or each faulty DC power transmission medium, in which the or each fault is located, based on the measured electrical characteristics of the plurality of DC power transmission media by determining a location of the or each fault within the or each faulty DC power transmission medium.

16. The system according to claim 10 further comprising a control station to communicate with the plurality of DC circuit interruption device stations, wherein the plurality of DC circuit interruption device stations are configured to close the or each DC circuit interruption device that is associated with the or each non-faulty DC power transmission medium, in which the or each fault is not located, by receiving, at the or each DC circuit interruption device station that is associated with the or each non-faulty DC power transmission medium, a control signal from the control station to initiate closing of the corresponding DC circuit interruption device.

17. The system according to claim 10 wherein the plurality of DC circuit interruption device stations are configured to close the or each DC circuit interruption device that is associated with the or each DC power transmission medium in which the or each fault is not located by closing the or each DC circuit interruption device that is associated with the or each non-faulty DC power transmission medium after a predetermined time delay after the opening of the DC circuit interruption devices of the corresponding DC circuit interruption device stations at which the or each fault is detected.

18. The system according to claim 10 further comprising a control station to communicate with the plurality of DC circuit interruption device stations, wherein the plurality of DC circuit interruption device stations are configured to inhibit closing of the or each DC circuit interruption device that is associated with the or each faulty DC power transmission medium, in which the or each fault is located, by receiving, at the or each DC circuit interruption device station that is associated with the or each faulty DC power transmission medium, a control signal from the control station to inhibit closing of the or each corresponding DC circuit interruption device.

* * * * *